United States Patent
Liu et al.

(10) Patent No.: US 11,675,983 B2
(45) Date of Patent: Jun. 13, 2023

(54) IMPLEMENTING TEXT GENERATION

(71) Applicant: BEIJING BAIDU NETCOM SCIENCE AND TECHNOLOGY CO., LTD., Beijing (CN)

(72) Inventors: Jiachen Liu, Beijing (CN); Zhe Hu, Beijing (CN); Xinyan Xiao, Beijing (CN); Hua Wu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/331,526

(22) Filed: May 26, 2021

(65) Prior Publication Data

US 2021/0286934 A1    Sep. 16, 2021

(30) Foreign Application Priority Data

Dec. 22, 2020 (CN) .......................... 202011523936.4

(51) Int. Cl.
*G06F 40/56* (2020.01)
*G06N 20/00* (2019.01)
(Continued)

(52) U.S. Cl.
CPC ............ *G06F 40/56* (2020.01); *G06F 40/117* (2020.01); *G06F 40/126* (2020.01); *G06N 20/00* (2019.01)

(58) Field of Classification Search
CPC .................................. G06F 40/56; G06N 20/00
See application file for complete search history.

(56) References Cited

U.S. PATENT DOCUMENTS

2019/0251431 A1* 8/2019 Keskar ................. G06N 3/0454
2019/0287012 A1* 9/2019 Celikyilmaz ............ G06N 3/08
(Continued)

FOREIGN PATENT DOCUMENTS

CN     111460833 A     7/2020
CN     111523304 A     8/2020
(Continued)

OTHER PUBLICATIONS

Howard et al., "Universal Language Model Fine-Tuning for Text Classification", arXiv:1801.0614v5 [cs.CL], May 23, 2018, (12 pages).

(Continued)

*Primary Examiner* — Keith D Bloomquist
(74) *Attorney, Agent, or Firm* — Seed IP Law Group LLP

(57) ABSTRACT

A method for implementing text generation, a device and a medium are provided. The method includes: determining a target task type of a target text generation task from multiple task types supported by a pre-trained general text generation model; determining, based on a requirement of the target text generation task for a target output text, a first target output text attribute for the target text generation task from multiple output text attributes supported by the general text generation model; and fine tuning the general text generation model based on a target training data set associated with the target text generation task to obtain a task-specific text generation model, by taking task indication information for the target task type and first attribute indication information for the first target output text attribute as at least part of an input of the general text generation model.

17 Claims, 6 Drawing Sheets

(51) Int. Cl.
  *G06F 40/126*  (2020.01)
  *G06F 40/117*  (2020.01)

(56) References Cited

U.S. PATENT DOCUMENTS

| | | | |
|---|---|---|---|
| 2021/0027770 A1* | 1/2021 | Olabiyi | G06F 18/2413 |
| 2021/0256069 A1* | 8/2021 | Grail | G06N 3/04 |
| 2021/0326747 A1* | 10/2021 | Shi | G06N 3/0427 |

FOREIGN PATENT DOCUMENTS

| | | |
|---|---|---|
| CN | 111625645 A | 9/2020 |
| CN | 111639163 A | 9/2020 |
| CN | 111709248 A | 9/2020 |
| CN | 112100375 A | 12/2020 |
| CN | 112232057 A | 1/2021 |
| JP | 2020140628 A | 9/2020 |

OTHER PUBLICATIONS

Hu, Maohan, "Research and Implementation of Wideband High Resolution Frequency Synthesizer," Master's Thesis, School of Computer Science & Engineering, 2020, pp. 47-51.

Li, Hoa, "Universal text based on advanced semantics generation and transfer learning," Master's thesis, Zhejiang University, Hangzhou, China, 2019, pp. 23-35.

* cited by examiner

IMPLEMENTING TEXT GENERATION

CROSS REFERENCE TO RELATED APPLICATION

This application claims priority to Chinese Patent Application No. 202011523936.4, field Dec. 22, 2020, the contents of which are hereby incorporated by reference in their entirety for all purposes.

BACKGROUND

Technical Field

The present disclosure generally relates to the field of artificial intelligence, and more specifically, to a natural language processing technology.

Description of the Related Art

Automatic text generation is an important research direction in the field of natural language processing. Text generation refers to generation of a desired output text through a model when an input text is given. One example application of text generation includes machine translation which may translate a text in one language into a text in another language. Other applications of text generation tasks also include automatic dialogs, abstract generation and the like. Although significant progress has been made in research and development of text generation algorithms, text generation still faces some challenges, including high dependency on training corpora, poor model versatility, and the like. Therefore, it is desirable to further improve a text generation process.

BRIEF SUMMARY

According to an embodiment of the present disclosure, a method and device for implementing text generation, device and a storage medium are provided.

According to a first aspect of the present disclosure, a method for implementing text generation is provided. The method comprises: determining a target task type of a target text generation task from multiple task types supported by a general text generation model wherein the general text generation model is pre-trained; determining, based on a requirement of the target text generation task for a target output text, at least one first target output text attribute for the target text generation task from multiple output text attributes supported by the general text generation model; and fine tuning the general text generation model based on a target training data set associated with the target text generation task to obtain a task-specific text generation model for the target text generation task, by taking task indication information for the target task type and first attribute indication information for the at least one first target output text attribute as at least part of an input of the general text generation model.

According to a second aspect of the present disclosure, an apparatus for implementing text generation is provided. The device comprises a task type determination module configured to determine a target task type of a target text generation task from multiple task types supported by a general text generation model, wherein the general text generation model is pre-trained; a first attribute determination module configured to determine at least one first target output text attribute for the target text generation task from multiple output text attributes supported by the general text generation model based on a requirement of the target text generation task for a target output text; and a model fine tuning module configured to fine tune the general text generation model based on a target training data set associated with the target text generation task to obtain a task-specific text generation model for the target text generation task, by taking task indication information for the target task type and first attribute indication information for the at least one first target output text attribute as at least part of an input of the general text generation model.

According to a third aspect of the present disclosure, an electronic device is provided. The electronic device comprises: at least one processor; and a memory communicatively connected with the at least one processor. The memory stores instructions executable by the at least one processor to cause the at least one processor to perform the method in the first aspect.

According to a fourth aspect of the present disclosure, a computer readable storage medium storing computer instructions is provided. The computer instructions are used to cause a computer to perform the method in the first aspect.

According to a fifth aspect of the present disclosure, a computer program product is provided. The computer program product comprises a computer program which, when executed by a processor, implements the method in the first aspect.

According to the embodiment of the present disclosure, dependence on the number of training corpora in various text generation tasks is reduced significantly, and the specific requirements of different text generation tasks may be met by providing a pre-trained general text generation model supporting multiple task types and multiple output text sequences.

It should be understood that the statements in this section are not intended to identify key or critical features of the embodiments of the present disclosure, nor are they intended to limit the scope of the present disclosure. Other features of the present disclosure will become apparent from the following description.

BRIEF DESCRIPTION OF THE SEVERAL VIEWS OF THE DRAWINGS

The above and other features, advantages and aspects of embodiments of the present disclosure will become more apparent upon consideration of the following detailed description, taken in conjunction with the accompanying drawings. In the drawings, the same or similar reference numerals indicate the same or similar elements.

DETAILED DESCRIPTION

Figure 1:
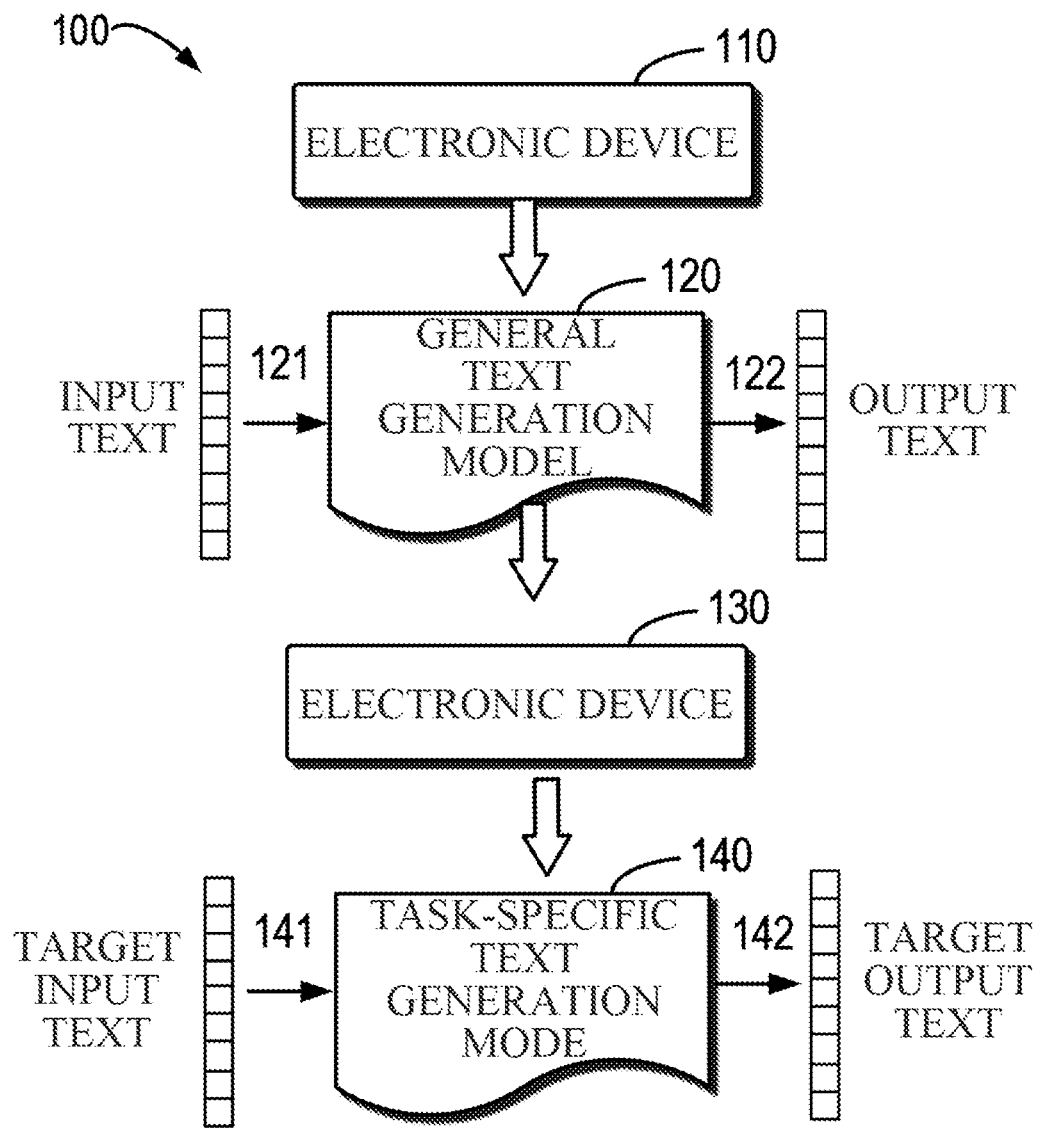
FIG. 1 illustrates a schematic diagram of an environment in which various embodiments of the present disclosure can be applied.

Example embodiments of the present disclosure are described below with reference to the accompanying drawings, in which various details of embodiments of the present disclosure are included to assist understanding, and which are to be considered as merely examples. Accordingly, those of ordinary skill in the art should recognize that various changes and modifications to the embodiments described herein can be made without departing from the scope and spirit of the present disclosure. Also, descriptions of well-known functions and structures are omitted in the following description for clarity and conciseness.

In descriptions of embodiments of the present disclosure, the terms "include" and "comprise," and similar terms, should be construed as open-ended, namely, "including but not limited to." The term "based on" should be construed as "based at least in part on." The term "one embodiment" or "the embodiment" should be construed as "at least one embodiment." The terms "first," "second," and the like may refer to different or the same objects. Other explicit and implicit definitions are also possible below.

As used herein, the term "model" may learn an association between the corresponding input and output from training data, such that a corresponding output may be generated for a given input after completion of training. Generation of the model may be based on a machine learning technology. Deep learning (DL) is a machine learning algorithm which processes an input and provides a corresponding output by using a multi-layer processing unit. A neural network (NN) model is one example of a model based on deep learning. "Model" may also be referred to herein as a "machine learning model," "learning model," "machine learning network," or "learning network," and these terms are used interchangeably herein.

Generally, machine learning or deep learning may generally include three phases, i.e., a training phase, a testing phase, and a usage phase (also referred to as an inference phase). In the training phase, a given model may be trained by using a large amount of training data and iterated continuously until the model is able to obtain consistent inference similar to the inference that human wisdom can make from the training data. By training, the model may be considered to be able to learn associations between an input and an output (also referred to as input-to-output mappings) from training data. Parameter values of the trained model are determined. In the testing phase, a test input is applied to the trained model to test whether the model is capable of providing a correct output, thereby determining the performance of the model. In the usage phase, the model can be used for processing actual input and determining a corresponding output based on parameter values obtained through the training.

As mentioned above, the problems of high dependence on training corpora, poor model versatility and the like still exist in the current text generation field. Generally, in application of automatic text generation, a text generation model may be trained with training corpora. The performance of the text generation model depends on constraints of the model, which are learned from the training corpora through a training process.

On the one hand, the current text generation model depends on a large scale of training corpora (also referred to as "parallel corpora") to enable the model to learn sufficient constraints. For example, a machine translation task requires a large number of corresponding statements in two languages, an automatic dialog task requires multiple rounds of dialog text in a dialog scenario, and an abstract generation task requires a large number of articles and abstracts of the articles.

However, it is impractical to obtain suitable large-scale corpora in many practical applications, particularly under the condition that the text generation task has some special requirements. For example, for the abstract generation task, if the requirement for the text generation task is to "generate an emotionally positive abstract less than 50 words in length for a self-media image-text article," it may be difficult in reality to find a large number of "self-media image-text articles" and corresponding "emotionally positive and attractive abstracts less than 50 words in length" as training corpora to train the model. Insufficient training corpora may cause model training to fail or be insufficient to constrain the model to be able to generate satisfactory results.

On the other hand, after the text generation model is trained for a specific task, the model does not have versatility. The model needs to be rebuilt and trained in the face of another text generation task which has different requirements. For example, for a new task of "generating an emotionally positive and attractive abstract less than 50 words in length for a self-media image-text article," due to the introduction of a new requirement of "attractive," training corpora need to be re-screened and a model needs to be rebuilt. The effect of this process is relatively low, and the effect may also be influenced due to reduction of the corpus scale.

A traditional training solution of the text generation model proposes to carry out specific control on a specific text generation task, for example, for a task of generating an abstract for an article, the style (for example, humor, clicking attraction and romance) of the abstract is controlled. Other solutions propose to control attributes of the output text of the text generation model. For example, for a dialog generation task, the effect of the dialog generation task in manual evaluation may be improved by controlling sentence patterns (for example, interrogative sentences) of the output text. However, these solutions still cannot solve the problems of insufficient training corpora and poor model versatility.

An improved text generation solution is provided in an embodiment of the present disclosure. According to the solution, a general text generation model is provided by pre-training, which is pre-trained to support multiple task types and multiple output text attributes. The general text generation model can be further fine tuned for different target text generation tasks. Corresponding requirements of different target text generation tasks for task types and output texts are met through multiple combinations of multiple task types and multiple output text attributes. For a specific target text generation task, after a target task type and one or more required target output text attributes for the target text generation task are determined from the multiple task types and the multiple output text attributes, respectively, the general text generation model is fine tuned by continuing to use a training data set associated with the target text generation task. Indication information of the target task type and the target output text attribute is provided as at least part of the input to the general text generation model.

The general text generation model can execute the target text generation task by using the training data set related to the task for fine tuning on the basis of pre-training. Due to the fact that the general text generation model has been pre-trained and can at least meet constraints on the target task type and the target output text attribute, the general text generation model can be trained into a task-specific text generation model capable of executing a specific target text generation task only through a small amount of training data in the fine tuning phase. Therefore, dependence on the number of training corpora in various text generation tasks is reduced significantly, and the specific requirements of different text generation tasks can be met.

Some example embodiments of the present disclosure will be described in detail below with reference to the accompanying drawings.

FIG. 1 illustrates a schematic diagram of an environment 100 in which multiple embodiments of the present disclosure can be applied. As shown in FIG. 1, the example environment 100 includes electronic device 110 configured to pre-train a general text generation model 120. The general text generation model 120 is configured as an automatic text generation model which generates an output text 122 for an input text 121. The pre-trained general text generation model 120 is provided to the electronic device 130.

The electronic device 130 is configured to fine tune the general text generation model 120 for a specific target text generation task to obtain a task-specific text generation model 140. The task-specific text generation model 140 can execute a target text generation task via fine tuning. Specifically, the task-specific text generation model 140 can process a target input text 141 for the target text generation task and generate a target output text 142 which meets the requirements of the target text generation task.

The electronic device 110 and/or 130 in FIG. 1 may be various device having computing capabilities. For example, the electronic device 110 and/or 130 may be a server device or a terminal device. The server device may be, for example, a centralized server, a distributed server, a mainframe, edge computing device, a cloud and the like. The terminal device may be, for example, various portable or fixed terminals such as a smartphone, a tablet computer, a desktop computer, a notebook computer, on-board device, navigation device, multimedia player device, a smart speaker, smart wearable device, and the like. It is noted that although shown as separated in FIG. 1, in some cases, the functionality of the electronic device 110 and/or 130 may be implemented by single physical device/system. That is, the single physical device/system may be configured to execute pre-training, training, and using of a model. Embodiments of the present disclosure are not limited in this aspect.

In the embodiment of the present disclosure, in order to reduce dependence on the number of training corpora in the modeling process for implementing the text generation task and improve the versatility of the model, a pre-trained architecture of the general text generation model is provided. On the basis of the pre-trained architecture, a text generation model, which meets different text generation requirements, may be generated for use by controlling the input of the model and executing the fine tuning process. The architecture of the general text generation model and the fine tuned model of example embodiments of the present disclosure will be discussed in detail below with reference to FIGS. 2-4.

Figure 2:
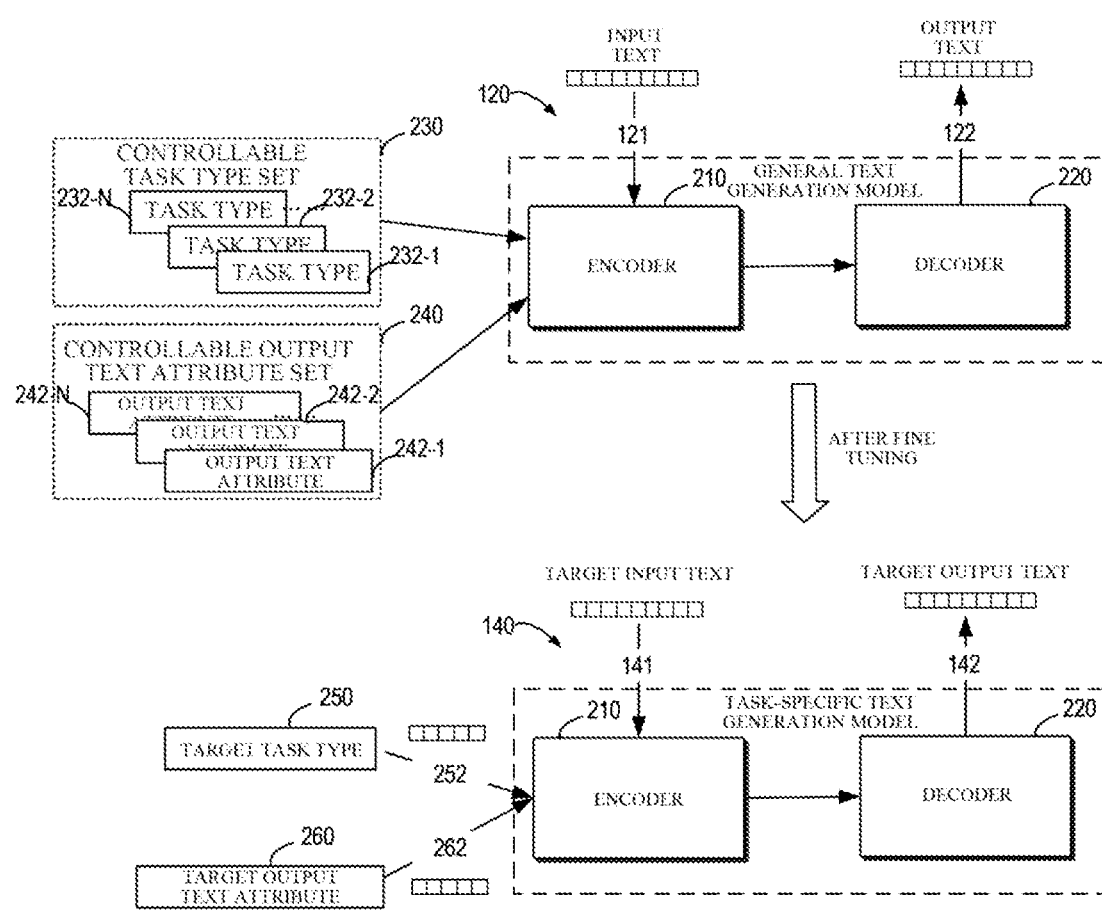
FIG. 2 illustrates a structural block diagram of a general text generation model and a task-specific text generation model generated based thereon according to some embodiments of the present disclosure.

FIG. 2 illustrates a structural block diagram of the general text generation model 120 and the task-specific text generation model 140 generated based thereon according to some embodiments of the present disclosure. The general text generation model 120 may be configured as any model structure capable of implementing automatic text generation. FIG. 2 illustrates an example encoder-decoder structure, wherein the general text generation model 120 comprises an encoder 210 and a decoder 220. The encoder 210 is configured to receive a model input, for example an input text 121, and process the model input to generate an intermediate feature representation. The intermediate feature representation is provided to the decoder 220. The decoder 220 generates a model output, for example an output text 122, based on the intermediate feature representation. In addition to the encoder-decoder structure, the general text generation model 120 may also be configured as another model structure capable of implementing automatic text generation. The embodiments of the present disclosure are not limited in this aspect.

In an embodiment of the present disclosure, the general text generation model 120 is pre-trained in a pre-training phase to support multiple (for example, N) text task types in a controllable text task type set 230, including a task type 232-1, a task type 232-2, ..., a task type 232-N, and the like. These task types are collectively or individually referred to as task types 232 for ease of discussion hereinafter. The general text generation model 120 is pre-trained in the pre-training phase to support multiple (for example, M) output text attributes in a controllable output text attribute set 240, including an output text attribute 242-1, an output text attribute 242-2, ..., an output text attribute 242-M, and the like. Therefore, the general text generation model 120 is also referred to as a general controllable text generation model.

Multiple text task types 232 indicate different types of text generation tasks. A so-called "text generation task" indicates what kind of processing is to be executed on the input text to provide the output text. Examples of text task types include, but are not limited to, an abstract generation task which requires important information to be extracted from the input text as the output text; a text rewriting task which requires output of texts with different words without changing semantics of the input text; a text resuming task which requires generation of an output text which is smooth and logical with the input text; and an automatic dialog task which requires generation of interactive contents as an output text according to the input text. Other text task types are also feasible. The multiple text task types 232 supported by the general text generation model 120 may be predetermined and the general text generation model 120 may learn how to execute these types of text generation tasks through a pre-training process. The pre-training process will be described in detail below.

Multiple output text attributes 242 refer to attributes of different aspects to be met by the output text of the general text generation model 120. The output text attribute 242 may be predetermined by different requirements desired to be met by the output text in a large number of text generation applications. Examples of the output text attribute 242 include, but are not limited to, the length, sentence patterns, style attributes, emotional tendencies and the like of the output text. Each output text attribute 242 may have one or more attribute values. For example, a "length" attribute may specify different length options for the output text; "sentence patterns" may specify sentence pattern structures such as declarative sentences, interrogative sentences, rhetorical sentences and exclamatory sentence; "style attributes" may specify different language styles of the output text, for example exaggerative, attractive, plain, formal and the like; and "emotional tendencies" may include positive emotional tendencies and negative emotional tendencies of the output text.

The controllable capabilities of the multiple task types 232 and the multiple output text attributes 242 may be achieved by executing pre-training on the general text generation model 120 with pre-training data by way of self-supervised learning. The target of the pre-training is to enable the general text generation model 120 to learn how to execute text generation tasks corresponding to multiple task types 232 on the input text and meanwhile distinguish different attribute values of each output text attributes 242 so as to enable the output text to meet these attributes.

In order to learn the target of executing the multiple task types 232, the pre-training data of the general text generation model 120 include multiple pre-training data sets, each of which includes training input texts and training output texts which are associated with one task type 232. For example, for a task type 232 indicating an "abstract generation task," its pre-training data set includes multiple articles or paragraphs and the like as training input texts, and also includes an abstract of each of the multiple articles or paragraphs as training output texts. Similarly, for other task types 232, training input texts and training output texts which conform to the task type may be provided as the pre-training data sets.

In the pre-training phase, the general text generation model 120 is trained with different pre-training data sets, respectively. In the pre-training phase, while the training input text in the pre-training data set associated with a certain task type 232 is provided to the general text generation model 120 (for example, provided to the encoder 210), task indication information indicating the task type 232 is also provided as input to the encoder 210 at the same time. The task indication information may facilitate the general text generation model 120 to distinguish for which task type learning is carried out currently. The task indication information may be any information capable of labeling a specific task type in the multiple task types 232. For example, if there are N task types, the task indication information may be determined as an N-dimensional binary sequence, wherein different task types correspond to corresponding flag bits in the binary sequence.

When the general text generation model 120 is trained with the pre-training data set associated with each task type 232, the training target of the general text generation model 120 is to generate an output text which meets task requirements based on an input text. The general text generation model 120 can learn the ability to process multiple tasks through the pre-training data sets associated with the multiple task types 232 and respective task indication information of the multiple task types 232.

For the multiple output text attributes 242, the general text generation model 120 may also be pre-trained in a similar manner with one or more pre-training data sets comprising an input text and an output text having different output text attributes 242. Other than learning of multiple task types requiring to be executed independently of each other, the general text generation model 120 may learn two or more output text attributes 242 simultaneously. For example, the training output text in the pre-training data set may be simultaneously labeled to have two or more output text attributes 242, so that the pre-training based on the pre-training data set may enable the general text generation model 120 to simultaneously learn how to output the output text which meets these output text attributes 242. This may accelerate the pre-training process.

Similar to pre-training on the multiple task types 232, while a training input text in the pre-training data set associated with the one or more output text attributes 242 is provided to the general text generation model 120 (for example, provided to the encoder 210), attribute indication information indicating the output text attributes 242 is also provided as input to the encoder 210 at the same time to facilitate the general text generation model 120 to distinguish for which output text attribute 242 or which output text attributes 242 learning is carried out currently. The attribute indication information may be any information capable of labeling specific output text attributes of the multiple output text attributes 242. For example, if there are M output text attributes, the attribute indication information may be determined as an M-dimensional binary sequence, wherein different output text attributes 242 correspond to corresponding flag bits in the binary sequence. The general text generation model 120 is able to learn the ability to output the output text having one or more output text attributes through the pre-training data sets associated with the multiple output text attributes 242 and respective attribute indication information of the multiple output text attributes 242.

While the general text generation model 120 is trained with the pre-training data sets associated with one or more output text attributes 242, the training target of the general text generation model 120 is to generate an output text which meets desired attribute values of the one or more output text attributes 242 based on the input text. The general text generation model 120 is able to learn an ability of processing multiple tasks through the pre-training data sets associated with the multiple output text attributes 242 and respective attribute indication information of the multiple output text attributes 242.

In some embodiments, in order to further accelerate pre-training, constraints on one or more output text attributes 242 may also be added while the general text generation model 120 is trained to execute text generation tasks corresponding to one or more task types 232. In this case, for a pre-training data set associated with one task type 232, the training output text therein may be labeled with different attribute values of one or more output text attributes 242. For example, for a pre-training data set of an abstract generation task, the length, sentence pattern, style attributes and the like of each training output text (i.e., an abstract) may be specifically labeled. These training output texts (i.e., abstracts) are selected with respective attribute values of these attributes to be learned, such as the length, sentence pattern, and style attributes. While the general text generation model 120 is trained with such pre-training data set, the training target of the general text generation model 120 is to generate an abstract of the input text, which should have desired length, sentence pattern and style attributes.

After the general text generation model 120 is trained with such pre-training data set, the general text generation model 120 can learn not only how to generate an abstract, but also how to generate an abstract with desired length, sentence pattern and style attributes. For other task types 232 and output text attributes 242, similar pre-training may be executed with associated pre-training data sets.

The general text generation model 120 is capable of supporting different task types and different output text attributes through pre-training. Such general text generation model 120 may be further fine tuned for a specific text generation task so as to be able to execute the corresponding text generation task. As described with reference to FIG. 1, pre-training of the general text generation model 120 may be executed by the electronic device 110, and the pre-trained general text generation model 120 may be provided to the electronic device 130 to be fine tuned for the specific text generation task.

When fine tuning is executed, a user may desire to obtain a text generation model which is capable of executing the target text generation task. A task-specific text generation model 140 may be generated by controlling the task types and output text attributes of the general text generation model 120 and fine tuning the model based thereon.

Specifically, when the target text generation task is given, it is determined whether the task type of the target text generation task is included in the multiple task types 232 supported by the general text generation model 120, and also whether the requirement of the target text generation task for the output text can be met by the multiple output text attributes 242. If the target task type 250 of the target text generation task can be determined from the multiple task types 232 and it is determined from the multiple output text attributes 242 that the one or more target output text attributes 260 can meet the requirement of the target text generation task for the output text, the corresponding target task type 250 and the one or more target output text attributes 260 will be selected, and subsequent model fine tuning will be executed.

For example, if the target text generation task is to "generate an attractive abstract less than 50 words in length for an input article," the task type of the target text generation task corresponds to the "abstract generation task," and there are requirements for both the "length" (for example, less than 50 words) and the "style attributes" (for example, attractive) of the output text. These task types and output text attributes are met by the pre-trained general text generation model 120.

After the target task type 250 and the one or more target output text attributes 260 are selected, the general text generation model 120 is fine tuned with the target training data set associated with the target text generation task. In the fine tuning process, task indication information 252 for the target task type 250 and attribute indication information 262 (sometimes also referred to as first attribute indication information) for the one or more target output text attributes 260 will be part of the input of the general text generation model 120. That is, the task indication information 252 and the attribute indication information 262 are also simultaneously input while the training input text in the target training data set is input to the general text generation model 120 (for example, input to the encoder 210). In this way, the general text generation model 120 is able to distinguish the corresponding task types and the output text attributes currently to be learned.

The target training data set associated with the target text generation task comprises a training input text and a training output text which are required by the target text generation task. For example, for a target text generation task of "generating an attractive abstract less than 50 words in length for an input article," the training input text is an article, and the training output text is "an attractive abstract less than 50 words in length" corresponding to the article. Since the general text generation model 120 has been trained (i.e., the pre-trained phase) to a certain degree in terms of "abstract generation task" and attributes such as "length" and "style attributes," the target training data set associated with the target text generation task does not need to provide a large number of training input texts and training output texts during fine tuning, but the general text generation model 120 can converge quickly to be able to execute the target text generation task well.

The general text generation model 120 may be trained as a task-specific text generation model 140 via fine tuning. As shown in FIG. 2, with fine tuning for the target text generation task, the task type (i.e., the target task type 250) and output text attributes (i.e., target output text attributes 260) of the task-specific text generation model 140 are fixed, and the corresponding task indication information 252 and attribute indication information 262 are provided as part of the input of the model to the encoder 210.

When a target text generation task is executed, a target input text 141 associated with the target text generation task is obtained, which together with the task indication information 252 and the attribute indication information 262 is applied as the input of the task-specific text generation model 140, for example, input to the encoder 210. By execution of the task-specific text generation model 140, the input may be processed by the task-specific text generation model 140, and an output is provided, for example, by the decoder 220. The output is the target output text 142 of the target text generation task. Execution of the target text generation task may be implemented by any electronic device including terminal device or server device. For example, execution of the target text generation task may be implemented by the electronic device 130, and may also be implemented by other devices other than the electronic device 130.

Due to versatility of the general text generation model 120, different task-specific text generation models may be generated for more target text generation tasks. The fine tuning process for generating each task-specific text generation model is similar to the foregoing fine tuning process. Since the multiple task types 232 and the multiple output text attributes 242 which are supported by the general text generation model 120 are controllable, various combinations of these task types and output text attributes may be used for meeting specific requirements of different text generation tasks.

Figure 3:
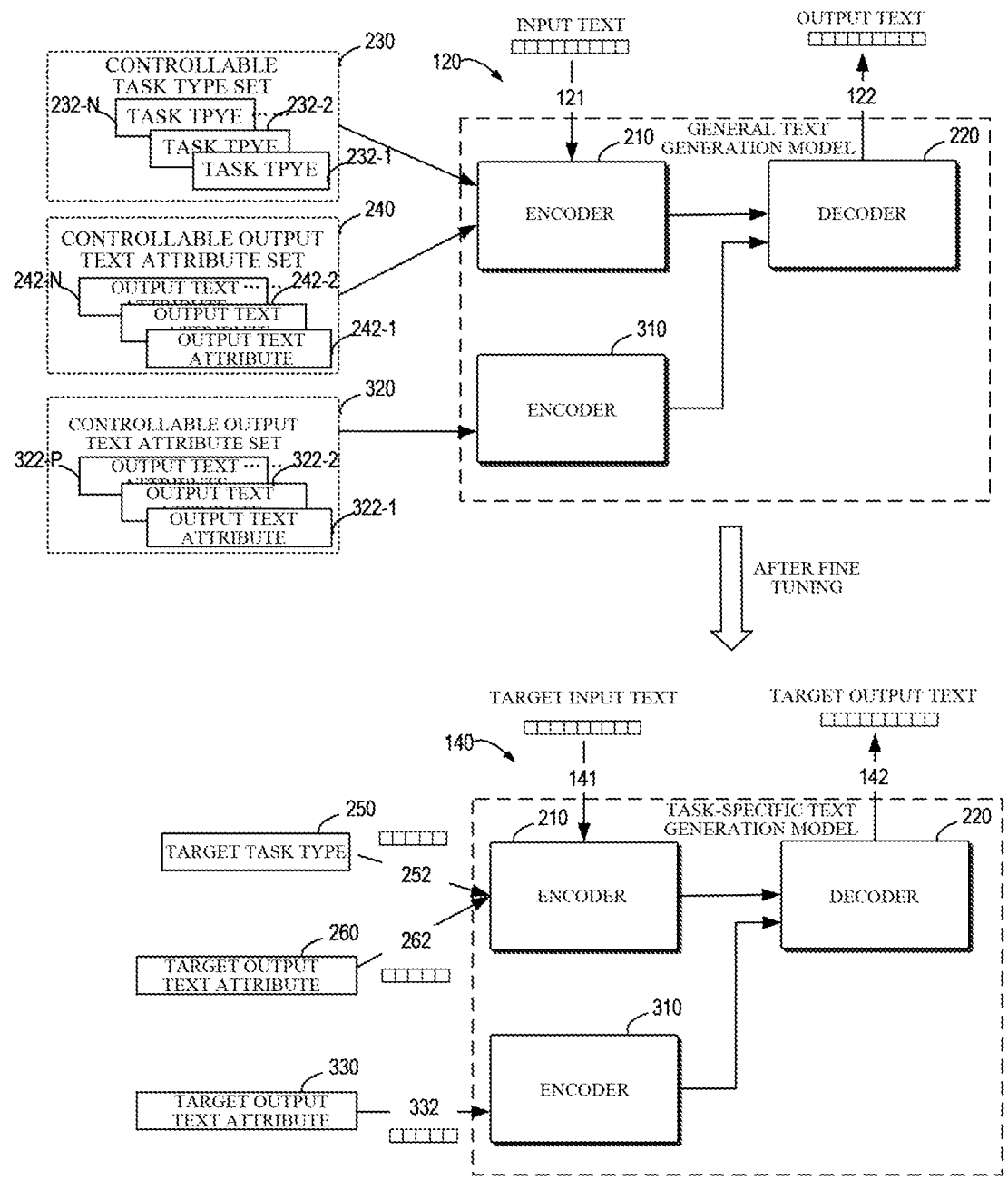
FIG. 3 illustrates a structural block diagram of a general text generation model and a task-specific text generation model generated based thereon according to some other embodiments of the present disclosure.

The support of the general text generation model 120 for controllable task types 232 and output text attributes 242 shown in FIG. 2 is achieved through the pre-training data sets and by constructing an overall objective function of the model. In some embodiments, the general text generating model 120 may also support one or more output text attributes. The support of these output text attributes is achieved by modifying the decoder 220 of the general text generation model 120. FIG. 3 illustrates such example embodiment.

In FIG. 3, the general text generation model 120 also comprises a decoder 220 for enabling the general text generation model 120 to support another controllable output text attribute set 320 which includes one or more output text attributes, for example an output text attribute 322-1, an output text attribute 322-2, . . . , an output text attribute 322-P and the like. These output text attributes are collectively or individually referred to as output text attributes 322 for ease of discussion. Although multiple output text attributes 322 are shown in figures, the output text attribute 322 may be a single.

The output text attributes 322 are used to control presence or absence of part of contents in the output text of the general text generation model 120. In some embodiments, the output text attributes 322 require specified words, phrases, and/or symbols to be included in the output text. In some embodiments, the output text attributes 322 require no specified words, phrases, and/or symbols to be included in the output text. The specific attribute values (for example, including or not including words, phrases, and/or symbols) of such output text attributes 322 may generally be specified by a user.

While the general text generation model 120 is pre-trained, in addition to the pre-training described above for the multiple task types 232 and the multiple output text attributes 322, pre-training is also executed for the output text attributes 322. Attribute indication information for a specific output text attribute 322 is provided as the input to the encoder 310. The encoder 310 processes the attribute indication information for the specific output text attribute 322 and provides an intermediate output to the decoder 220 to enable the decoder 220 to generate an output text which conforms to the output text attribute 322. The intermediate output of the encoder 310 may affect the decoding results of the decoder 220. For example, if the decoder 220 determines various characters in the output text based on a beam search, the intermediate output of the encoder 310 may be used to control the characters selected by the decoder 220 in the beam search, thereby controlling the output text to be able to conform to the output text attribute 322. In another example, the intermediate output of the encoder 310 may also control the decoding sequence of the decoder 220 to execute decoding starting from the words, phrases, and/or symbols specified by the output text attributes 322 to ensure that the output text includes or does not include the specified words, phrases, and/or symbols.

The output text attributes 322 have stronger control capabilities for the output text of the general text generation model 120 and are suitable for deploying output text attributes which need to be strictly met. When the general text generation model 120 is fine tuned for the target text generation task, it is assumed that the target output text attributes required by the target text generation task are included in the controllable output text attribute set 320. In the fine tuning process, one or more output text attributes 322 required by the target text generation task are determined from the controllable output text attribute set 320. Attribute indication information for the one or more target output text attributes 322 is applied as the input to the encoder 310. The attribute indication information may include an embedded representation or a vectorized representation of the content specified by the output text attribute 322, such as a vectorized representation of a specific word or sentence after being converted.

As one example, it is assumed that the target text generation task is to "generate an attractive abstract that contains a personal name in the title of an article and is less than 50 words in length for the input article." In this target text generation task, "containing a personal name in the title of the article" is an indication of the specific content in the output text, and it requires that the generated abstract must include the specific personal name. Thus, in a process of fine tuning the general text generation model 120, an output text attribute 322 is specified where the output text includes a specific word, and the attribute indication information for the output text attribute 322 is also applied to the encoder 310 as the input to the general text generation model 120.

For example, for the output text attribute of "containing a personal name in the title of the article," the personal name in the title of the training input text (for example, an article) of the target training data set needs to be determined during fine tuning, and the personal name is converted to a vectorized representation as the attribute indication information. The vectorized representation indicating the personal name in the title of the article is simultaneously input to the encoder 310 when the general text generation model 120 is trained with a certain article. The general text generation model 120 can learn that the output text meets attributes specified by the input received by the encoder 310 through training of the training data set.

After fine tuning, a task-specific text generation model 140 is obtained. The input of the task-specific text generation model 140 is the same as the input of the general text generation model 120 in the fine tuning phase. As shown in FIG. 3, attribute indication information 332 (sometimes also referred to as second attribute indication information) indicating a target output text attribute 330, together with the task indication information 250 and the attribute indication information 260, is input to the task-specific text generation model 140, wherein the attribute indication information 332 is input to the encoder 310, and the task indication information 252 and attribute indication information 262 are input to the encoder 210. In application of the task-specific text generation model 140, the attribute indication information 332 is determined based on the specific contents (for example, specifically specified words, phrases, and/or symbols) specified by target output text attributes 330.

Figure 4:
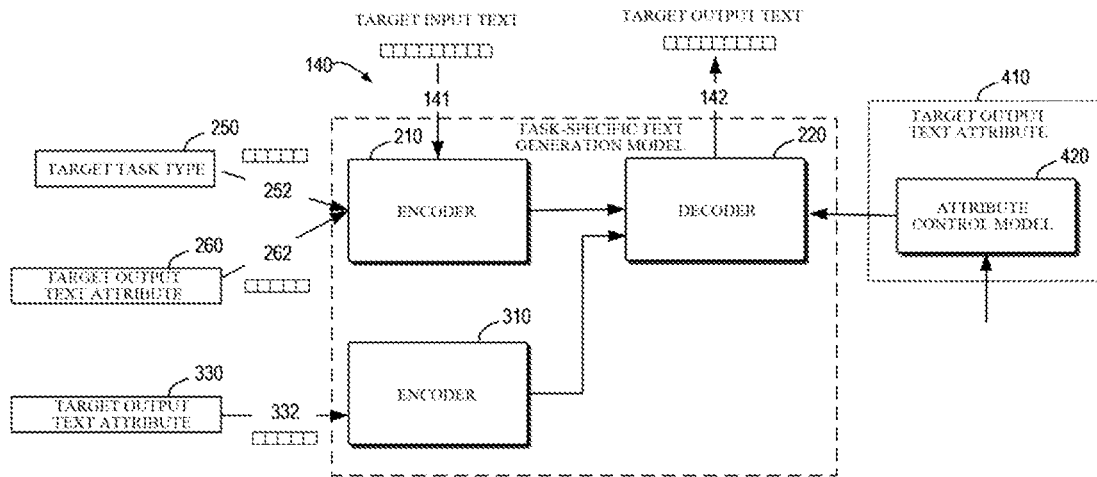
FIG. 4 illustrates a structural block diagram of a general text generation model and a task-specific text generation model generated based thereon according to some other embodiments of the present disclosure.

In the example embodiments discussed above, the task type 232, the output text attribute 242 and the output text attribute 322 which are supported by the general text generation model 120 are all pre-specified in the pre-training phase. However, demands for text generation tasks are diverse in practical applications, and some of the demands may not be covered by the pre-specified task type 232, output text attribute 242 and output text attribute 322. Extensions to the general text generation model 120 in the fine tuning phase are also provided in some embodiments. FIG. 4 illustrates such example implementation. It is noted that a task-specific text generation model 140 based on the embodiment of FIG. 3 is shown in FIG. 4. In other embodiments, extensions may also be implemented based on the task-specific text generation model 140 shown in FIG. 2.

As shown in FIG. 4, in the fine tuning phase, the task-specific text generation model 140 may be generated by adding an extensible target output text attribute 410. The target output text attribute 410 may be an attribute which is required to be met by the output text through the specific target text generation task, but the attribute is not included in the output text attributes 242 and 322 supported by the general text generation model 120. In this case, an attribute control model 420 may be added into the structure of the general text generation model 120.

In some embodiments, after the attribute control model 420 is added, the attribute control model 420 and the general text generation model 120 are jointly fine tuned, based on the target training data set associated with the target text generation task, to determine the task-specific text generation model 140.

The attribute control model 420 is configured to control the decoder 220 to be able to output the output text having the target output text attribute 410 so as to meet the requirement of the current target text generation task for the target output text. For example, it is assumed that the target text generation task is to "generate an attractive and emotionally positive abstract that contains a personal name in the title of an article and is less than 50 words in length for the input article," wherein the requirement on emotional tendency (i.e., "emotionally positive") of the output abstract cannot be met by the controllable output text attribute set

240 or 320 shown in FIG. 3. In this case, it is desirable to add the attribute control model 420 which can meet the attribute of the output text in terms of the emotional tendency.

The attribute control model 420 may be pre-trained to be able to guide the output of a text generation task having the target output text attribute 410. The input of the attribute control model 420 may be an intermediate output of the encoder 210. The attribute control model 420 may process the intermediate output from the encoder 210 and control the decoding process of the decoder 220 based on the processing results so as to output the target output text 142 which meets the target output text attribute 410.

In some embodiments, the attribute control model 420 may be configured as an attribute classifier which is capable of determining guidance information for guiding the decoder 220 to generate the target output text 142 having the target output text attribute 410 based on the intermediate output of the encoder 210 (also including the encoder 310 in some embodiments). Guidance information is a kind of classification information which indicates different attribute values of the target output text attribute 410. The guidance information can be used by the decoder 220 when the output text is decoded such that the target output text 142 meets the specific target output text attribute 410. For example, the guidance information may be used to guide the decoder 220 to select words in the target output text 142 such that the target output text 142 has an "emotionally positive" emotional tendency.

In some embodiments, the attribute control model 420 may be configured as a language model corresponding to the target output text attribute 410. Because the decoder 220 is also a language model in nature, the attribute control model 420 may decode the intermediate output of the encoder in conjunction with the decoder to generate the target output text 142 having the target output text attribute 410. For example, parameters of the attribute control model 420 may be mixed with parameters of the decoder 220, and the intermediate output of the encoder 210 (as well as the encoder 310) is decoded based on the mixed parameters.

In some embodiments, according to the requirements of the target text generation task, an attribute control model corresponding to multiple target output text attributes which are not supported by the general text generation model 120 may be introduced. Attribute extensions provided in FIG. 4 enable the general text generation model 120 to adapt to more text generation task requirements.

According to an example implementation of the present disclosure, a method for implementing text generation and an apparatus for text generation are provided.

Figure 5:
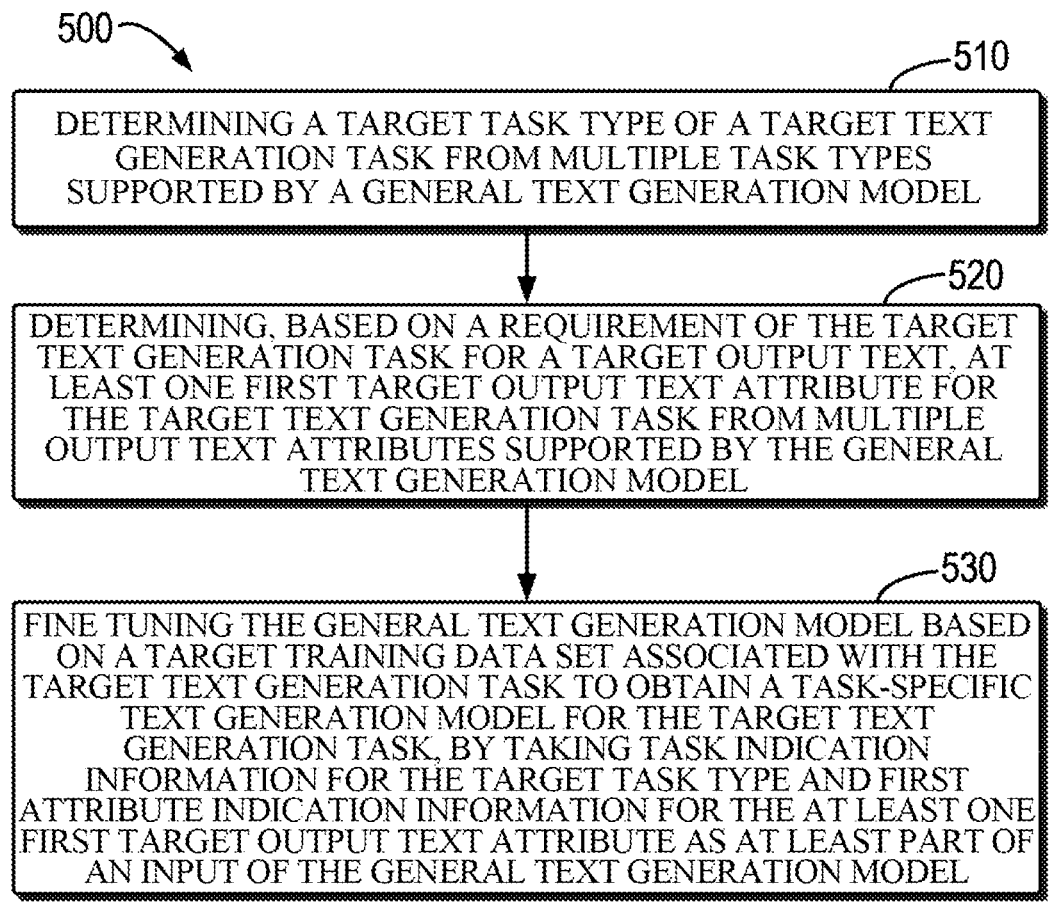
FIG. 5 illustrates a flowchart of a method for implementing text generation according to some embodiments of the present disclosure.

FIG. 5 illustrates a flowchart of a method 500 for implementing text generation according to some embodiments of the present disclosure. The method 500 may be implemented by the electronic device 130 in FIG. 1.

At block 510, the electronic device 130 determines a target task type of a target text generation task from multiple task types supported by a general text generation model. The general text generation model is pre-trained.

At block 520, the electronic device 130 determines, based on a requirement of the target text generation task for a target output text, at least one first target output text attribute for the target text generation task from multiple output text attributes supported by the general text generation model.

At block 530, the electronic device 130 fine tunes the general text generation model based on a target training data set associated with the target text generation task to obtain a task-specific text generation model for the target text generation task, by taking task indication information for the target task type and first attribute indication information for the at least one first target output text attribute as at least part of an input of the general text generation model.

In some embodiments, the general text generation model is pre-trained based on multiple pre-training data sets. The multiple pre-training data sets respectively include training input texts and training output texts associated with corresponding task types in the multiple task types.

In some embodiments, a training output text in at least one pre-training data set of the multiple pre-training data sets is labeled with different attribute values of at least one output text attribute of the multiple output text attributes.

In some embodiments, the general text generation model at least comprises a first encoder to receive an input text and a decoder to generate an output text. The task indication information and the first attribute indication information are to be input to the first encoder. In some embodiments, fine tuning the general text generation model further comprises: determining second attribute indication information indicating a second target output text attribute for the target text generation task; and fine tuning the general text generation model based on the target training data set by applying the second attribute indication information as the input of a second encoder in the general text generation model.

In some embodiments, the general text generation model at least comprises a first encoder to receive an input text and a decoder to generate an output text based on an intermediate output of the first encoder. The task indication information and the first attribute indication information are to be input to the first encoder. In some embodiments, fine tuning the general text generation model further comprises: obtaining an attribute control model configured to control the decoder to output the target output text having a third target output text attribute based on the intermediate output of the first encoder, wherein the third target output text attribute is not included in the multiple output text attributes; and fine tuning the attribute control model and the general text generation model jointly.

In some embodiments, the attribute control model includes at least one of: an attribute classification model configured to determine, based on the intermediate output of the first encoder, guidance information for guiding the decoder to generate the target output text having the third target output text attribute, wherein the guide information indicates different attribute values of the third target output text attribute; and a language model configured to, in conjunction with the decoder, decode the intermediate output of the first encoder to generate the target output text having the third target output text attribute.

In some embodiments, the target text generation task is a first target text generation task, and the method further comprises: determining a second target task type of a second target text generation task from multiple task types; determining, based on a requirement of the second target text generation task for a target output text, a further target output text attribute for the second target text generation task from the multiple output text attributes; and fine tuning the general text generation model based on a second target training data set associated with the second target text generation task to obtain a further task-specific text generation model for the second target text generation task, by taking second task indication information for the second target task type and further attribute indication information for the further target output text attribute as at least part of an input of the general text generation model.

In some embodiments, the method 500 further comprises: obtaining a target input text for the target text generation task; applying the target input text, the task indication information and the first attribute indication information as an input of the task-specific text generation model; and executing the task-specific text generation model to obtain an output of the task-specific text generation model as the target output text of the target text generation task.

Figure 6:
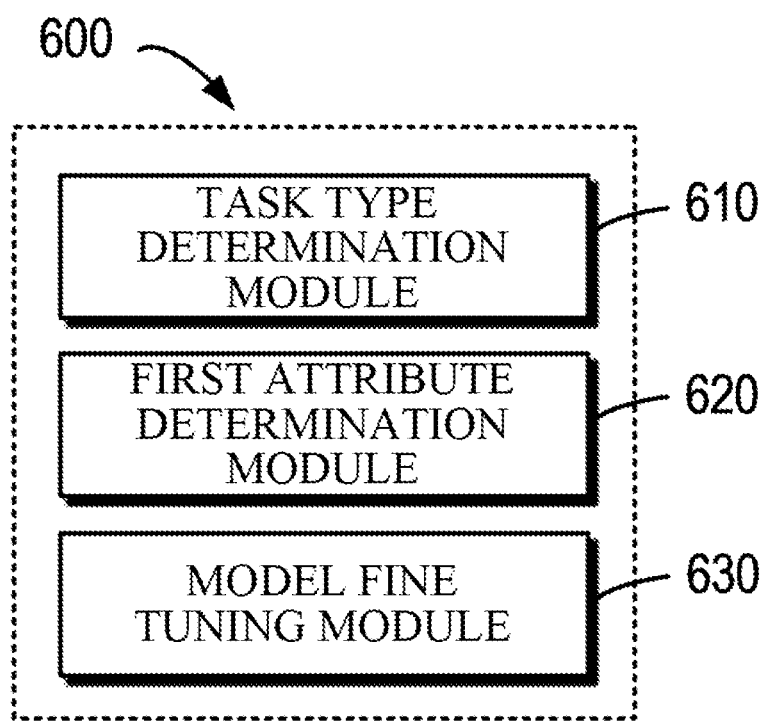
FIG. 6 illustrates a block diagram of an apparatus for implementing text generation according to some embodiments of the present disclosure.

FIG. 6 illustrates a schematic block diagram of an apparatus 600 for implementing text generation according to some embodiments of the present disclosure. The apparatus 600 may be included in or implemented as the electronic device 130 in FIG. 1.

As shown in FIG. 6, the apparatus 600 comprises a task type determination module 610 configured to determine a target task type of a target text generation task from multiple task types supported by a general text generation model. The general text generation model is pre-trained. The apparatus 600 further comprises a first attribute determination module 620 configured to determine at least one first target output text attribute for the target text generation task from multiple output text attributes supported by the general text generation model based on a requirement of the target text generation task for a target output text. The apparatus 600 further comprises a model fine tuning module 630 configured to fine tune the general text generation model based on a target training data set associated with the target text generation task to obtain a task-specific text generation model for the target text generation task, by taking task indication information for the target task type and first attribute indication information for the at least one first target output text attribute as at least part of an input of the general text generation model.

In some embodiments, the general text generation model is pre-trained based on multiple pre-training data sets. The multiple pre-training data sets respectively include training input texts and training output texts associated with corresponding task types in the multiple task types.

In some embodiments, a training output text in at least one pre-training data set of the multiple pre-training data sets is labeled with different attribute values of at least one output text attribute of the multiple output text attributes.

In some embodiments, the general text generation model at least comprises a first encoder to receive an input text and a decoder to generate an output text. The task indication information and the first attribute indication information are to be input to the first encoder. The apparatus 600 comprises: a second attribute determination module configured to determine second attribute indication information indicating a second target output text attribute for the target text generation task. The model fine tuning module 630 comprises a further fine tuning module configured to fine tune the general text generation model based on the target training data set by applying the second attribute indication information as an input of a second encoder in the general text generation model.

In some embodiments, the general text generation model at least comprises a first encoder to receive an input text and a decoder to generate an output text based on an intermediate output of the first encoder. The task indication information and the first attribute indication information are to be input to the first encoder. In some embodiments, the model fine tuning module 630 comprises: an extended attribute control module configured to obtain an attribute control model, wherein the attribute control model is configured to control the decoder to output the target output text having a third target output text attribute based on the intermediate output of the first encoder, and the third target output text attribute is not included in the multiple output text attributes; and a joint fine tuning module configured to fine tune the attribute control model and the general text generation model jointly.

In some embodiments, the attribute control model includes at least one of: an attribute classification model configured to determine, based on the intermediate output of the first encoder, guidance information for guiding the decoder to generate the target output text having the third target output text attribute, wherein the guide information indicates different attribute values of the third target output text attribute; and a language model configured to, in conjunction with the decoder, decode the intermediate output of the first encoder to generate the target output text having the third target output text attribute.

In some embodiments, the target text generation task is a first target text generation task. The apparatus 600 further comprises: an additional task type determination module configured to determine a second target task type of a second target text generation task from the multiple task types; an additional attribute determination module configured to determine a further target output text attribute for the second target text generation task from the multiple output text attributes based on a requirement of the second target text generation task for a target output text; and an additional model fine tuning module configured to fine tune the general text generation model based on a second target training data set associated with the second target text generation task to obtain a further task-specific text generation model for the second target text generation task, by taking second task indication information for the second target task type and further attribute indication information for the further target output text attribute as at least part of an input of the general text generation model.

In some embodiments, the apparatus 600 further comprises: a text obtainment module configured to obtain a target input text for the target text generation task; an input application module configured to apply the target input text, the task indication information and the first attribute indication information as an input of the task-specific text generation model; and a model execution module configured to execute the task-specific text generation model to obtain an output of the task-specific text generation model as the target output text of the target text generation task.

According to an example implementation of the present disclosure, electronic device and a readable storage medium are further provided.

Figure 7:
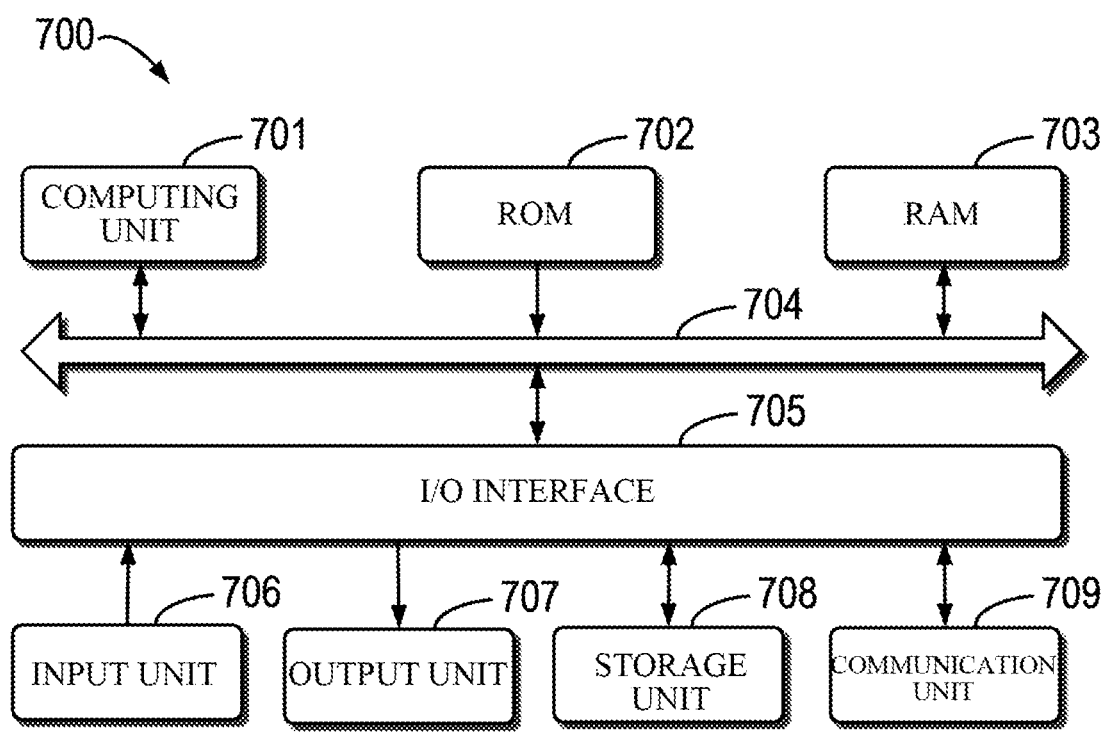
FIG. 7 illustrates a block diagram of an electronic device capable of implementing various embodiments of the present disclosure.

FIG. 7 illustrates a schematic block diagram of an example electronic device 700 which may be used for implementing the embodiment of the present disclosure. The electronic device 700 may be used for implementing or being included in electronic device 110 or electronic device 130 in FIG. 1.

As shown in the figure, electronic device 700 comprises a computing unit 701 which may execute various proper actions and processing according to a computer program instruction stored in a read-only memory (ROM) 702 or a computer program instruction loaded to a random access memory (RAM) 703 from a storage unit 708. In the RAM 703, various procedures and data may also be stored, which are required for operations of the electronic device 700. The computing unit 701, the ROM 702 and the RAM 703 are connected with each another through a bus 704. An input/output (I/O) interface 705 is also connected to the bus 704. It should be understood that each component of the electronic device 700 may also be connected in other manners other that through the bus.

Multiple components in the electronic device 700 are connected to the I/O interface 705. These components include: an input unit 706, such as a touch screen, a keypad, a mouse, a trackpad, a touchpad, a pointing stick, one or more mouse buttons, a trackball, a joystick and other input devices; an output unit 707, such as various types of display device (for example, which may be touch screens), speakers, auxiliary lighting devices (for example, LED), and haptic feedback devices (for example, vibration motors) and the like; a storage unit 708, such as a magnetic disk, an optical disk and the like; and a communication unit 709, such as a network card, a modem, a wireless communication transceiver and the like. The communication unit 709 allows the electronic device 700 to exchange information/data with other device through a computer network, such as the Internet, and/or various telecommunication networks.

The computing unit 701 may be various general and/or special processing components with processing and computing capabilities. Some examples of the computing unit 701 include, but are not limited to, a central processing unit (CPU), a graphics processing unit (GPU), various special artificial intelligence (AI) computing chips, various computing units running machine learning model algorithms, a digital signal processor (DSP), and any suitable processor, controller, microcontroller and the like. The computing unit 701 executes various methods and processing described above, such as the method 500. For example, in some embodiments, the method 500 may be implemented as a computer software program tangibly embodied in a machine-readable medium, such as the storage unit 708. In some embodiments, part or all of the computer program may be loaded and/or installed onto the electronic device 700 via the ROM 702 and/or the communication unit 709. One or more steps of the method 500 described above may be executed when the computer program is loaded into the RAM 703 and executed by the computing unit 701. Alternatively, in other embodiments, the computing unit 701 may be configured to execute the method 500 in any other suitable manner (for example, by way of firmware).

According to an example implementation of the present disclosure, a computer-readable storage medium is provided, with computer-executable instructions stored thereon, wherein the computer-executable instructions are executed by a processor to implement the method described above. According to an example implementation of the present disclosure, a computer program product is also provided, comprising computer programs/computer executable instructions executed by the processor to implement the method described above. In some implementations, the computer program product may be tangibly stored on a non-transient computer-readable medium.

Various implementation of the systems and technologies described herein may be implemented in a digital electronic circuitry system, an integrated circuitry system, ASICs (application-specific integrated circuits), computer hardware, firmware, software, and/or combinations thereof. These various implementations may include: implementation in one or more computer programs which are executable and/or interpretable on a programmable system including at least one programmable processor. The programmable processors may be dedicated or general-purpose programmable processors, which may receive data and instructions from a storage system, at least one input device and at least one output device, and transmit the data and instructions to the storage system, the at least one input device and the at least one output device.

These computing programs (also called as programs, software, software applications, or codes) include machine instructions of the programmable processor, and may be implemented with an advanced process and/or object-oriented programming language, and/or assembly/machine language. As used herein, the terms "computer-readable medium" and "computer-readable media" refer to any computer program product, device, and/or apparatus (for example, magnetic disks, optical disks, memories, programmable logic devices (PLDs)) used to provide machine instructions and/or data to the programmable processor, including a computer-readable medium which receives a machine instruction as a machine-readable signal. The term "machine-readable signal" refers to any signal used to provide the machine instruction and/or data to the programmable processor.

For interaction with the user, the systems and technologies described herein may be implemented on a computer with: a display device (for example, a CRT (cathode ray tube) or LCD (liquid crystal display) monitor) for displaying information to the user; and a keyboard and a pointing device (for example, a mouse or trackball) through which the user may provide input to the computer. Other kinds of devices may also be used for interaction with the user; for example, feedback provided to the user may be any form of sensory feedback (for example, visual feedback, auditory feedback, or tactile feedback); and the input from the user may be received in any form (including acoustic input, voice input, or tactile input).

The systems and technologies described herein may be implemented in a computing system which includes a background component (for example, as a data server), or a computing system which includes a middleware component (for example, an application server), or a computing system which includes a front-end component (for example, a user computer with a graphical user interface or web browser, through which the user may interact with implementation of the systems and technologies described herein) or a computing system which includes any combination of such background components, middleware components, or front-end components. The components of the system may be interconnected by any form or medium of digital data communication (for example, communication networks). Examples of the communication networks include a local area network (LAN), a wide area network (WAN) and the Internet.

The computer system may include a client and a server. The client and the server are generally far away from each other and typically interact through the communication network. The relationship between the client and the server is achieved by virtue of computer programs running on the corresponding computers and having a client-server relationship to each other.

Program codes for implementing the method of the present disclosure may be written in any combination of one or more programming languages. These program codes may be provided to a processor or controller of a general-purpose computer, a dedicated computer, or other programmable data processing device, such that the program codes, when executed by the processor or the controller, enable the functions/operations specified in the flowchart and/or block diagram to be implemented. The program codes may be executed entirely on a machine, partly on the machine, partly on the machine as a stand-alone software package, partly on a remote machine, or entirely on the remote machine or a server.

In the context of the present disclosure, the computer-readable medium may be a tangible medium which may contain or store a program for use by or in connection with an instruction execution system, an apparatus, or a device. The computer-readable medium may be a machine-readable signal medium or a machine-readable storage medium. The computer-readable medium may include, but is not limited to, an electronic, magnetic, optical, electromagnetic, infrared, or semiconductor system, apparatus, or device, or any suitable combination thereof. More specific examples of the machine-readable storage medium may include one or more wire-based electrical connection, a portable computer diskette, a hard disk, a random access memory (RAM), a read-only memory (ROM), an erasable programmable read-only memory (EPROM or flash memory), an optical fiber, a convenient compact disc read-only memory (CD-ROM), optical storage device, magnetic storage device, or any suitable combination thereof.

It should be understood that various forms of the procedures described above may be used and reordered, and steps thereof may be added or deleted. For example, the steps described in the present application may be executed in parallel, sequentially, or in different orders, as long as the desired results of the technical solutions disclosed in the present disclosure can be achieved. The present disclosure are not limited in this aspect.

The above specific implementations should not be construed as limiting the scope of protection of the present disclosure. It should be understood by those skilled in the art that various modifications, combinations, sub-combinations and substitutions may be made according to the design requirements and other factors. Any modification, equivalent, and improvement made within the spirit and principle of the present disclosure should be included in the scope of protection of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   determining a target task type of a target text generation task from multiple task types supported by a general text generation model, wherein the general text generation model is pre-trained;
   determining, based on a requirement of the target text generation task for a target output text, at least one first target output text attribute for the target text generation task from multiple output text attributes supported by the general text generation model;
   determining second attribute indication information indicating a second target output text attribute for the target text generation task; and
   fine tuning the general text generation model based on a target training data set associated with the target text generation task to obtain a task-specific text generation model for the target text generation task, by:
      inputting task indication information for the target task type and first attribute indication information for the at least one first target output text attribute to a first encoder in the general text generation model;
      inputting the second attribute indication information to a second encoder in the general text generation model; and
      generating an output text based on an intermediate output of the first encoder and an intermediate output of the second encoder,
   wherein the target training data set is an additional data set other than pre-training data sets for pre-training the general text generation model.

2. The method according to claim 1, wherein the general text generation model is pre-trained based on multiple pre-training data sets respectively comprising training input texts and training output texts associated with corresponding task types in the multiple task types.

3. The method according to claim 2, wherein a training output text in at least one pre-training data set of the multiple pre-training data sets is labeled with different attribute values of at least one output text attribute of the multiple output text attributes.

4. The method according to claim 1, wherein fine tuning the general text generation model further comprises:
   obtaining an attribute control model configured to control the decoder to output the target output text having a third target output text attribute based on the intermediate output of the first encoder and the intermediate output of the second encoder, wherein the third target output text attribute is not included in the multiple output text attributes; and
   fine tuning the attribute control model and the general text generation model jointly.

5. The method according to claim 4, wherein the attribute control model comprises at least one of:
   an attribute classification model configured to determine, based on the intermediate output of the first encoder and the intermediate output of the second encoder, guidance information for guiding the decoder to generate the target output text having the third target output text attribute, wherein the guidance information indicates different attribute values of the third target output text attribute; and
   a language model configured to, in conjunction with the decoder, decode the intermediate output of the first encoder and the intermediate output of the second encoder to generate the target output text having the third target output text attribute.

6. The method according to claim 1, wherein the target text generation task is a first target text generation task, and the method further comprises:
   determining a second target task type of a second target text generation task from the multiple task types;
   determining, based on a requirement of the second target text generation task for a target output text, a further target output text attribute for the second target text generation task from the multiple output text attributes; and
   fine tuning the general text generation model based on a second target training data set associated with the second target text generation task to obtain a further task-specific text generation model for the second target text generation task, by taking second task indication information for the second target task type and further attribute indication information for the further target output text attribute as at least part of an input of the general text generation model.

7. The method according to claim 1, further comprising:
obtaining a target input text for the target text generation task;
applying the target input text, the task indication information and the first attribute indication information as an input of the task-specific text generation model; and
executing the task-specific text generation model to obtain an output of the task-specific text generation model as the target output text of the target text generation task.

8. An electronic device, comprising:
at least one processor; and
a memory communicatively connected with the at least one processor, wherein the memory stores instructions executable by the at least one processor to cause the at least one processor to:
determine a target task type of a target text generation task from multiple task types supported by a general text generation model, wherein the general text generation model is pre-trained;
determine at least one first target output text attribute for the target text generation task from multiple output text attributes supported by the general text generation model based on a requirement of the target text generation task for a target output text;
determine second attribute indication information indicating a second target output text attribute for the target text generation task; and
fine tune the general text generation model based on a target training data set associated with the target text generation task to obtain a task-specific text generation model for the target text generation task, by:
inputting task indication information for the target task type and first attribute indication information for the at least one first target output text attribute to a first encoder in the general text generation model;
inputting the second attribute indication information to a second encoder in the general text generation model; and
generating an output text based on an intermediate output of the first encoder and an intermediate output of the second encoder,
wherein the target training data set is an additional data set other than pre-training data sets for pre-training the general text generation model.

9. The electronic device according to claim 8, wherein the general text generation model is pre-trained based on multiple pre-training data sets respectively comprising training input texts and training output texts associated with corresponding task types in the multiple task types.

10. The electronic device according to claim 9, wherein a training output text in at least one pre-training data set of the multiple pre-training data sets is labeled with different attribute values of at least one output text attribute of the multiple output text attributes.

11. The electronic device according to claim 8, wherein fine tuning the general text generation model comprises:
obtaining an attribute control model configured to control the decoder to output the target output text having a third target output text attribute based on the intermediate output of the first encoder and the intermediate output of the second encoder, wherein the third target output text attribute is not included in the multiple output text attributes; and
fine tuning the attribute control model and the general text generation model jointly.

12. The electronic device according to claim 11, wherein the attribute control model comprises at least one of:
an attribute classification model configured to determine, based on the intermediate output of the first encoder and the intermediate output of the second encoder, guidance information for guiding the decoder to generate the target output text having the third target output text attribute, wherein the guidance information indicates different attribute values of the third target output text attribute; and
a language model configured to, in conjunction with the decoder, decode the intermediate output of the first encoder and the intermediate output of the second encoder to generate the target output text having the third target output text attribute.

13. The electronic device according to claim 8, wherein the target text generation task is a first target text generation task, and the instructions upon execution further cause the at least one processor to:
determine a second target task type of a second target text generation task from the multiple task types;
determine a further target output text attribute for the second target text generation task from the multiple output text attributes based on a requirement of the second target text generation task for a target output text; and
fine tune the general text generation model based on a second target training data set associated with the second target text generation task to obtain a further task-specific text generation model for the second target text generation task, by taking second task indication information for the second target task type and further attribute indication information for the further target output text attribute as at least part of an input of the general text generation model.

14. The electronic device according claim 8, wherein the instructions upon execution further cause the at least one processor to:
obtain a target input text for the target text generation task;
apply the target input text, the task indication information and the first attribute indication information as an input of the task-specific text generation model; and
execute the task-specific text generation model to obtain an output of the task-specific text generation model as the target output text of the target text generation task.

15. A non-transitory computer readable storage medium storing computer instructions for causing a computer to:
determine a target task type of a target text generation task from multiple task types supported by a general text generation model, wherein the general text generation model is pre-trained;
determine, based on a requirement of the target text generation task for a target output text, at least one first target output text attribute for the target text generation task from multiple output text attributes supported by the general text generation model;
determine second attribute indication information indicating a second target output text attribute for the target text generation task; and
fine tune the general text generation model based on a target training data set associated with the target text generation task to obtain a task-specific text generation model for the target text generation task, by:
- inputting task indication information for the target task type and first attribute indication information for the at least one first target output text attribute to a first encoder in the general text generation model;
- inputting the second attribute indication information to a second encoder in the general text generation model; and
- generate an output text based on an intermediate output of the first encoder and an intermediate output of the second encoder, wherein the target training data set is an additional data set other than pre-training data sets for pre-training the general text generation model.

16. The non-transitory computer readable storage medium according to claim 15, wherein the general text generation model is pre-trained based on multiple pre-training data sets respectively comprising training input texts and training output texts associated with corresponding task types in the multiple task types.

17. The non-transitory computer readable storage medium according to claim 15, wherein fine tuning the general text generation model comprises:
- obtaining an attribute control model configured to control the decoder to output the target output text having a third target output text attribute based on the intermediate output of the first encoder and the intermediate output of the second encoder, wherein the third target output text attribute is not included in the multiple output text attributes; and
- fine tuning the attribute control model and the general text generation model jointly.

* * * * *